United States Patent [19]

Sullivan

[11] 4,306,748
[45] Dec. 22, 1981

[54] LIFE JACKET INSTALLATION

[75] Inventor: Kenneth Sullivan, Woking, England

[73] Assignee: Aircraft Furnishing Limited, Surrey, England

[21] Appl. No.: 81,124

[22] Filed: Oct. 2, 1979

[51] Int. Cl.³ .............................................. A47C 7/62
[52] U.S. Cl. ................................. 297/193; 297/217; 9/12
[58] Field of Search ............... 297/193, 192, 191, 217; 9/12, 7; 5/59 C

[56] References Cited

U.S. PATENT DOCUMENTS

| 802,275 | 10/1905 | Fentrick | 9/12 |
| 1,333,554 | 3/1920 | Melcher | 297/193 |
| 1,631,131 | 6/1927 | Hoeldtke | 5/59 C |
| 1,824,156 | 9/1931 | Kimble | 5/59 C |
| 2,104,818 | 1/1938 | Schjolin | 297/191 |
| 2,497,412 | 2/1950 | Larin | 9/12 X |
| 3,154,345 | 10/1964 | Lambrecht | 297/192 |
| 3,516,098 | 6/1970 | O'Link | 297/193 |
| 3,903,554 | 9/1975 | Dodd | 297/193 |

Primary Examiner—Francis K. Zugel
Attorney, Agent, or Firm—Toren, McGeady & Stanger

[57] ABSTRACT

The invention provides a lifejacket in conjunction with a seat, particularly for hovercraft or hydrofoils. A combined seat pan and back support forms a tray to stow a lifejacket and a seat squab fits over the lifejacket. The squab is readily liftable and a pull tab is provided to lift the forward edge of the lifejacket out of the tray in the support.

1 Claim, 3 Drawing Figures

LIFE JACKET INSTALLATION

This invention relates to the installation of lifejackets in conjunction with seats, particularly in hovercraft hydrofoils and similar high speed vessels. The invention may also have application in aircraft seats.

It has long been accepted that where an emergency escape from a public transport craft or vessel might be into the sea, then it is necessary to provide lifejackets and/or life rafts. In aircraft, and also high speed crafts such as hovercraft and hydrofoils, it is the established custom to provide lifejackets associated with each passenger seat. Normally an inflatable jacket is stowed under each seat.

Inflatable lifejackets do have the advantage that they occupy a small stowage space, and are reasonably convenient to put on within the confined space normally available, but they do have the disadvantage of needing to be inflated, in the case of aircraft in particular, after leaving the aircraft. There is thus a very vital step to be performed after leaving the aircraft, and this can cause considerable difficulties with children or elderly or infirm passengers. Also, it must be remembered that where a lifejacket is to be used, then there will be a considerable element of fright which would impair the normal faculties. The lifejackets are generally automatically inflatable, and inflatable lifejackets of this type are fairly expensive, both to manufacture and to maintain in the constant state of readiness which is necessary. Being automatically inflatable, there is also the problem that premature inflation is possible which leads to a risk of a passenger being trapped within the vessel through being unable to leave through the exit door while wearing the lifebelt. Inflatable lifejackets are not normally permissible in marine craft.

Non-inflatable lifejackets are available but they are more bulky and present a considerable stowage problem which militates against adoption in the comparatively confined spaces, particularly of high speed marine passenger craft in which space is at a premium, in which a lifejacket has to be provided adjacent each seat.

According to the present invention, there is provided a seat, in or for a marine vessel or aircraft, comprising a seat pan and a seat back support, seat cushion means supported on the seat pan and seat back support, wherein the seat pan and seat back support define, in conjunction with the said seat cushion means a cavity to receive a lifejacket for stowage in a readily withdrawable manner, the said cavity extending from a location adjacent the front area of the seat pan to a location at least partially up the seat back support.

Preferably, the seat also includes a combined seat squab and back squab which has a hollow to accommodate the lifejacket, which then extends upwardly into the seat back at the rear of the seat pan on which it is supported.

The combined squab may pivot about the upper end of the back squab portion to provide easy access to the lifejacket.

The forward end of the lifejacket may be rested on a pull-tag to lift the said forward end when required so as to aid rapid removal of the lifejacket.

The invention also comprises, in combination, a non-inflatable lifejacket of the type wherein buoyancy is provided by blocks of rigid foam, and a seat for a marine vessel or aircraft, the seat comprising a seat pan and a seat cushion supported on the seat pan, in which the seat cushion and seat pan define a cavity therebetween which receives the lifejacket in a readily withdrawable manner.

The invention will be further described with reference to the accompanying drawings, in which.

Figure 1:
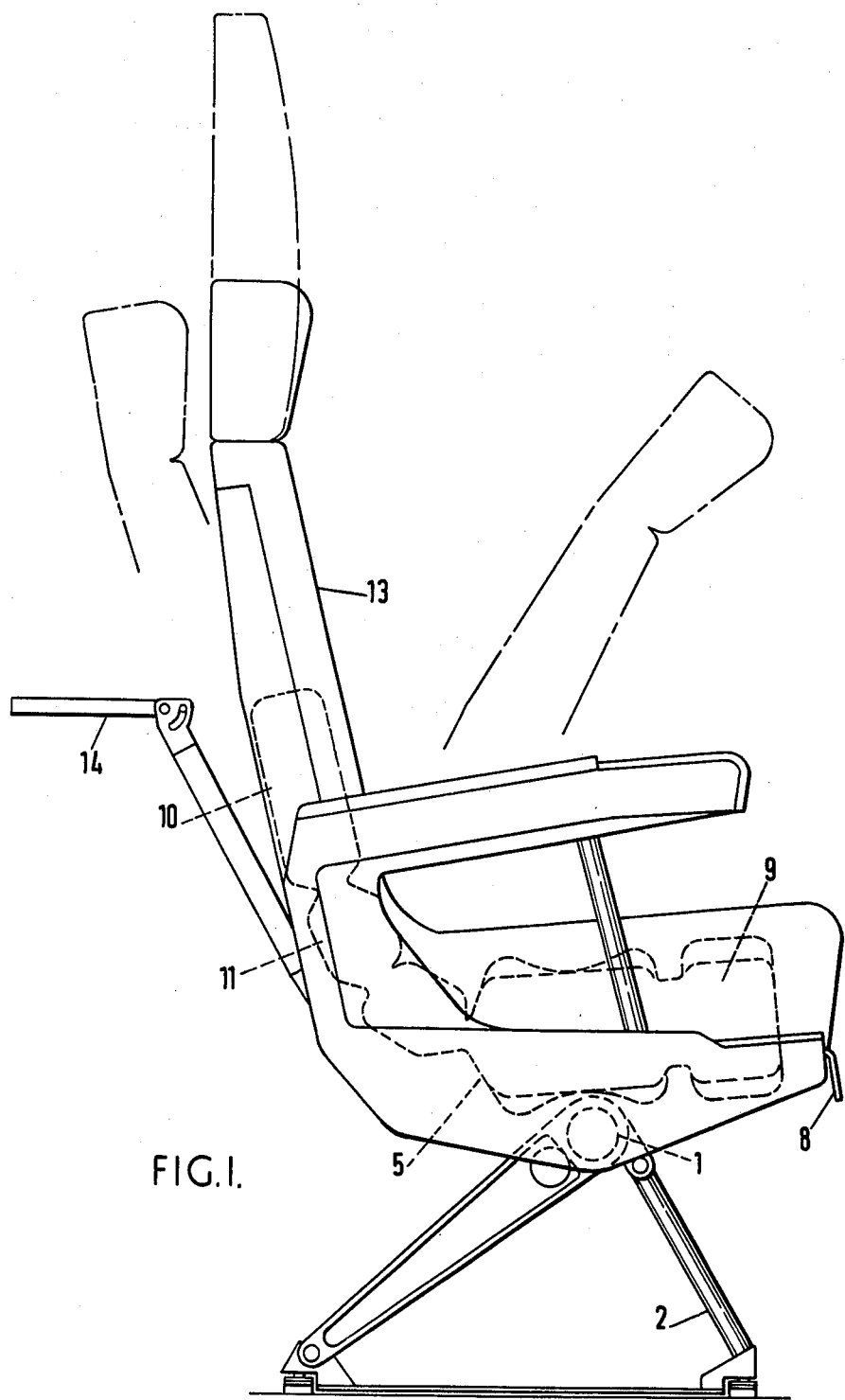
FIG. 1 is a side elevation of a seat installation incorporating a lifejacket according to a form of the invention.

The drawings show a group of seats mounted on a transverse beam member 1 supported on laterally spaced legstructures 2 which are located in floor rails 3. Beam member 1 carries longitudinal frame member 4, and these support a seat pan and back support combined, indicated generally by the reference 5. A forward portion 5a of the seat pan is shown as having an upstanding forward wall 6 so that is forms a tray, the sides of which are limited by spacer blocks 7. A pull-tag 8 is mounted in each forward portion 5a so that on being pulled taut to the position shown in the nearest seat visible in FIG. 2 it will serve to lift a lifejacket stowed on the seat pan. The lifejacket has been omitted from this particular seat to show the arrangement of the pull-tag 8, and on the other two seats it is shown in its normal position.

Figure 2:
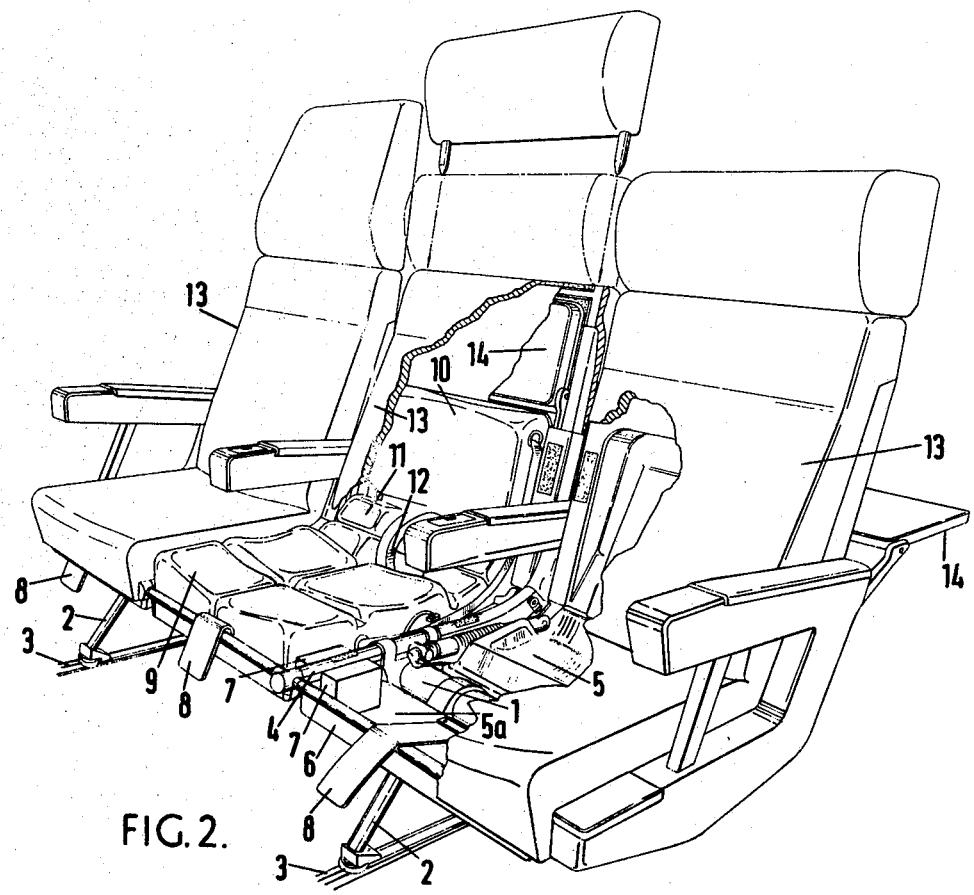
FIG. 2 is a perspective view of a set of seats, two of which are partially cut away, and from one of which the lifejacket has been removed.

The central seat of those shown in FIG. 2 is shown with its seat and back squab cut away to reveal the position of a lifejacket of an approved marine type with buoyancy provided by blocks of rigid foam. This lifejacket is illustrated as having a front portion 9, a back portion 10 and an intermediate shoulder portion 11 which has a neck aperture 12. As can be seen from FIG. 2 in particular, the lifejacket consists of blocks of the foam material located within a tough outer casing. The seat pan and back support 5 is contoured so that the lifejacket fits snugly thereon, and as can be seen from the drawings, the lifejacket is surmounted by a combined seat and back squab 13 which with the seat pan and back support 5 forms a hollow cavity for the lifejacket. The upper portion of the squab 13 is also seen, in the centre seat shown in FIG. 2, to provide a hollow for a stowed position of a table 14 to extend rearwardly from that seat.

Figure 3:
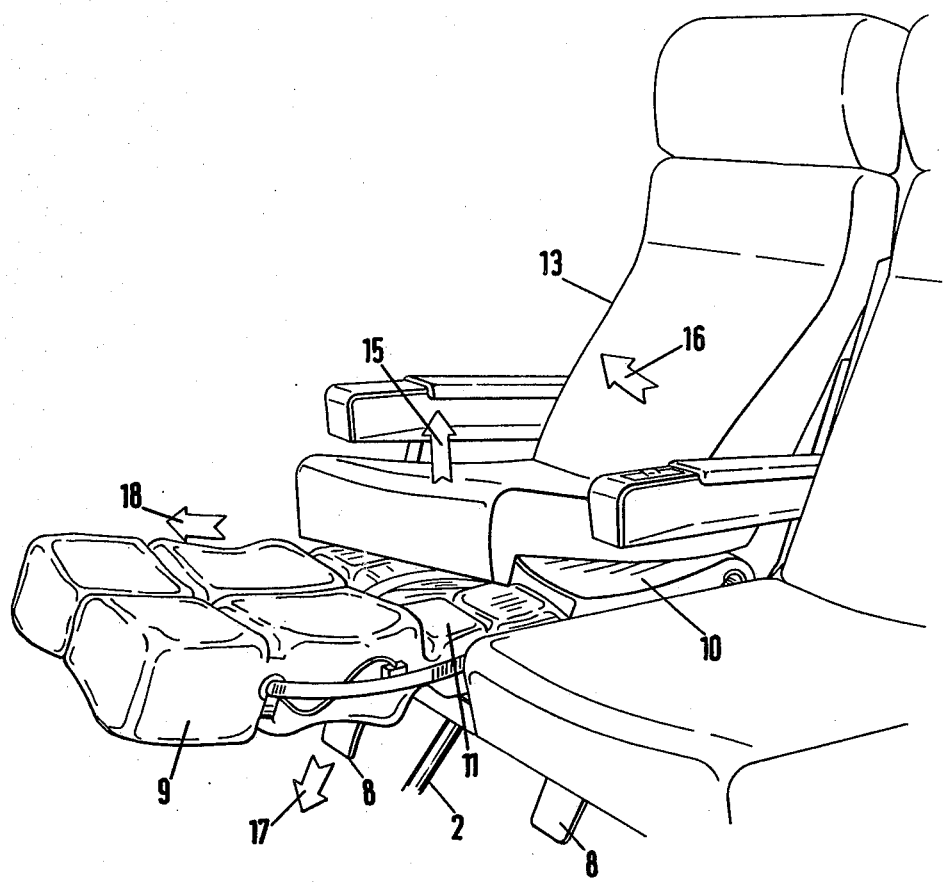
FIG. 3 is a further perspective view illustrating the sequence of operations in removing the jacket from its stowed position.

Referring in particular to FIG. 3, a procedure for removing the lifejacket from its stowed position wholly within the seat is illustrated by a series of arrows. The first stage is to lift the combined seat and back squab 13 so that it pivots about its upper edge as indicated by the arrows 15 and 16. The pull-tag 8 is then pulled down as indicated by the arrow 17 and this pulls that tag into its support position so that the front end of the lifejacket is lifted over the front wall 6 and the whole lifejacket can then be withdrawn as indicated by the arrow 18 by a steady pulling action.

It will be appreciated that the lifejacket, being of rigid foam, does not provide any contribution to the upholstering of the seat so that the squab 13 must provide all of the cushioning required. If a suitable lifejacket were available which had resilient properties, then these could be used to assist in the upholstering of the seat with the consequent reduction in the required thickness of the squab 13.

Various modifications may be made within the scope of the invention.

I claim:

1. A seat assembly particularly for marine vessels and aircraft comprising, in combination:

a seat pan and seat back support;

a seat and back cushion member formed as an integral unitary part having a seat portion with a forwardmost edge and a back portion extending upwardly and rearwardly from said seat portion, said back portion having an uppermost terminal edge at which said seat and back cushion member is pivotally mounted on said seat back support with said seat portion overlying said seat pan and with said back portion extending over said seat back support forwardly thereof;

said unitary seat back and cushion member being constructed to define in cooperation with said seat pan and seat back support a hollow cavity which extends continuously from adjacent said forwardmost edge of said seat portion to a location at least partially up said seat back support through a substantial portion of the volume enclosed between said seat back support and said back portion of said seat and back cushion member;

said seat and back cushion member being adapted to be raised by being pivoted bodily relative to said seat back support about said pivotal mounting thereof by grasping of said forwardmost edge of said seat portion to permit ready access to said cavity;

a non-inflatable lifejacket consisting essentially of buoyant rigid foam displacing a generally constant volume stored within said cavity, said lifejacket being readily removable from said cavity when said seat and back cushion member is raised by pivotal movement thereof about said pivotal mounting; and a pull tag affixed to said seat pan operative to enable said lifejacket to be raised from said seat pan to facilitate removal thereof from said hollow cavity by pulling of said lifejacket forwardly from said cavity after said seat and back cushion member has been pivotally raised.

* * * * *